United States Patent
Owechko

(10) Patent No.: US 11,567,816 B2
(45) Date of Patent: Jan. 31, 2023

(54) TRANSITIVE TENSOR ANALYSIS FOR DETECTION OF NETWORK ACTIVITIES

(71) Applicant: HRL Laboratories, LLC, Malibu, CA (US)

(72) Inventor: Yuri Owechko, Newbury Park, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 184 days.

(21) Appl. No.: 16/936,240

(22) Filed: Jul. 22, 2020

(65) Prior Publication Data

US 2020/0348997 A1    Nov. 5, 2020

Related U.S. Application Data

(63) Continuation-in-part of application No. 16/298,367, filed on Mar. 11, 2019, now Pat. No. 10,755,141, (Continued)

(51) Int. Cl.
*G06F 11/07* (2006.01)

(52) U.S. Cl.
CPC ...... *G06F 11/0751* (2013.01); *G06F 11/0709* (2013.01)

(58) Field of Classification Search
CPC . G06F 11/0751; G06F 11/0709; G06F 11/008
See application file for complete search history.

(56) References Cited

U.S. PATENT DOCUMENTS

| 8,204,988 | B2 | 6/2012 | Lin et al. | |
| 9,043,905 | B1 * | 5/2015 | Allen | H04L 63/1425 726/22 |

(Continued)

FOREIGN PATENT DOCUMENTS

| CN | 108170639 A | 6/2018 |
| WO | WO2017-044082 A1 | 3/2017 |
| WO | WO2017-111832 A1 | 6/2017 |

OTHER PUBLICATIONS

Cichocki et al., "Tensor Decompositions for Signal Processing Applications From two-way to multiway compoenent analysis", IEEE Signal Processing Magazine, 2015.*

(Continued)

*Primary Examiner* — Catherine T. Rastovski
(74) *Attorney, Agent, or Firm* — Tope-McKay & Associates

(57) ABSTRACT

Described is a system for detection of network activities using transitive tensor analysis. The system divides a tensor into multiple subtensors, where the tensor represents communications on a communications network of streaming network data. Each subtensor is decomposed, separately and independently, into subtensor mode factors. Using transitive mode factor matching, orderings of the subtensor mode factors are determined. A set of subtensor factor coefficients is determined for the subtensor mode factors, and the subtensor factor coefficients are used to determine the relative weighting of the subtensor mode factors, and activity patterns represented by the subtensor mode factors are detected. Based on the detection, an alert of an anomaly is generated, indicating a in the communications network and a time of occurrence.

20 Claims, 15 Drawing Sheets

Related U.S. Application Data which is a continuation-in-part of application No. 16/034,780, filed on Jul. 13, 2018, now Pat. No. 10,726,311, application No. 16/298,367, which is a continuation-in-part of application No. 16/127,927, filed on Sep. 11, 2018, now Pat. No. 10,885,928.

(60) Provisional application No. 62/684,364, filed on Jun. 13, 2018, provisional application No. 62/624,054, filed on Jan. 30, 2018, provisional application No. 62/558,094, filed on Sep. 13, 2017.

(56) References Cited

U.S. PATENT DOCUMENTS

| | | | |
|---|---|---|---|
| 9,668,066 | B1 | 5/2017 | Betts |
| 11,288,240 | B1* | 3/2022 | Sayad ............... G06Q 30/0241 |
| 2008/0247608 | A1* | 10/2008 | Vasilescu ............. G06K 9/6242 382/118 |
| 2011/0288379 | A1 | 11/2011 | Wu |
| 2015/0296214 | A1 | 10/2015 | Mahfoodh et al. |
| 2016/0358107 | A1 | 12/2016 | Kokkinis |
| 2017/0168991 | A1 | 6/2017 | Baskaran et al. |
| 2018/0293691 | A1 | 10/2018 | Nurvitadhi |
| 2019/0080210 | A1 | 3/2019 | Owechko |
| 2019/0205696 | A1 | 7/2019 | Owechko |

OTHER PUBLICATIONS

Harshman, R., "Foundations of the PARAFAC Procedure: Models and Conditions for an Explanatory Multimodal Factor Analysis", UCLA Working Papers in Phonetics, 1970.*
Tomasai, G., "Practical and computational aspects in chemometric data analysis", Dept. Food Scienct, Royal Veterinary and Agricultural U., Denmark, 2006.*
Notification of Transmittal of International Search Report and the Written Opinion of the International Searching Authority for PCT/US2019/021620; dated Jun. 26, 2019.
International Search Report of the International Searching Authority for PCT/US2019/021620; dated Jun. 26, 2019.
Written Opinion of the International Searching Authority for PCT/US2019/021620; dated Jun. 26, 2019.
Guoxu Zhou et al., 'Linked Component Analysis From Matrices to High-Order Tensors: Applications to Biomedical Data', In: Proceedings of the IEEE, vol. 104, Issue 2, Feb. 2016.
Kiers et al. PARAFAC2-Part I. A Direct Fitting Algorithm for the PARAFAC2 Model. Journal of Chemometrics, 13, pp. 275-294, 1999.
N. Sidiropoulos et al. in "Tensor decomposition for signal processing and machine learning," IEEE Trans. on Signal Processing, vol. 65, No. 13, pp. 3551-3582, 2017.
Office Action 1 for U.S. Appl. No. 16/298,367, dated Jan. 9, 2020.
Cichocki, et al., "Tensor decompositions for Signal Processing Applications, From two-way to multiway component analysis", IEEE Signal Processing Magazine (145) 2015.
Vervliet, et all, "Canonical polyadic decomposition", http://www.tensorlab.net/doc/cpd.html, last updated on May 9, 2017 accessed Jul. 15, 2019.
Clifford, "Singular Value Decomposition & Independent Component Analysis for Blind Source Separation", Biomedical Signal and Image Processing, 2005.
Notice of Allowance for U.S. Appl. No. 16/298,367, dated Apr. 22, 2020.
Response to Office Action 1 for U.S. Appl. No. 16/127,927 (Non-TMA), dated Apr. 6, 2020.
Office Action 2 for U.S. Appl. No. 16/127,927 (Non-TMA), dated Jun. 4, 2020.
Response to Office Action 2 for U.S. Appl. No. 16/127,927 (Non-TMA), dated Jul. 28, 2020.
Notice of Allowance 1 for U.S. Appl. No. 16/127,927 (Non-TMA), dated Sep. 8, 2020.
Notice of Allowance 2 for U.S. Appl. No. 16/127,927 (Non-TMA), dated Oct. 7, 2020.
The International Search Report and The Written Opinion of the International Searching Authority for PCT/US2020/043130; dated Apr. 20, 2021.
Grey, B., et al., "Communication Lower Bounds for Matricized Tensor Times Khatri-Rao Product," 2018, IEEE International Parallel and Distributed Processing Symposium (IPDPS), pp. 557-567.
Li, X., et al., "Focusing Decomposition Accuracy by Personalizing Tensor Decomposition (PTD)," Conference on Information And Knowledge Management, ACM, New York, 2014, pp. 689-698.
Huang, S., et al., "BICP: Block Incremental CP Decomposition with Update Sensitive Refinement," Conference on Information and Knowledge Management, ACM, New York, 2016, pp. 1221-1230.
A. Harshman in "Foundations of the PARAFAC procedure: Model and conditions for an explanatory multi-mode factor analysis," UCLA Working Papers in Phonetics, vol. 16, 1970, pp. 1-84.
Tomasi in Practical and computational aspects in chemometric data analysis, Ph.D. thesis, Department of Food Science, The Royal Veterinary and Agricultural University, Frederiksberg, Denmark, 2006, pp. 1-286.
N. Sidiropoulos et al. in "Tensor decomposition for signal processing and machine learning," IEEE Trans. on Signal Processing, vol. 65, No. 13, 2017, pp. 3551-3582.
Notification of Transmittal of International Search Report and the Written Opinion of the International Searching Authority for PCT/US2018/042008; dated Nov. 26, 2018.
International Search Report of the International Searching Authority for PCT/US2018/042008; dated Nov. 26, 2018.
Written Opinion of the International Searching Authority for PCT/US2018/042008; dated Nov. 26, 2018.
Office Action 1 for U.S. Appl. No. 16/034,780, dated Jul. 18, 2019.
Acar, et al., Scalable tensor factorizations for incomplete data, Chemometrics and Inteligent Laboratory Systems, 106 (1) 2011, pp. 41-56.
Kolda and Bader, "Tensor Decompositions and Applications", Sandia Report, Nov. 2007.
Response to Office Action 1 for U.S. Appl. No. 16/034,780, dated Oct. 18, 2019.
Office Action 2 for U.S. Appl. No. 16/034,780, dated Nov. 29, 2019.
Response to Office Action 2 for U.S. Appl. No. 16/034,780, dated Jan. 30, 2020.
Notice of Allowance for U.S. Appl. No. 16/034,780, dated Mar. 20, 2020.
Response to Office Action 1 for U.S. Appl. No. 16/298,367, dated Apr. 8, 2020.
Office Action 1 for U.S. Appl. No. 16/127,927 (Non -TMA), dated Jan. 6, 2020.
Lakmal, et al., "Blind Source Separation in Real Time Using Second Order Statistics," Master of Science thesis, Blekinge Institute of Technology, Sep. 2007.
Yang, et al., "Time-Frequency Filter Bank: A Simple Approach for Audio and Music Separation," IEEE Access, vol. 5, 2017.

* cited by examiner

TRANSITIVE TENSOR ANALYSIS FOR DETECTION OF NETWORK ACTIVITIES

CROSS-REFERENCE TO RELATED APPLICATIONS

This is a Continuation-in-Part application of U.S. application Ser. No. 16/298,367, filed in the United States on Mar. 11, 2019, entitled, "Streaming Data Tensor Analysis Using Blind Source Separation, which is a Continuation-in-Part application of U.S. application Ser. No. 16/034,780, filed in the United States on Jul. 13, 2018, entitled, "Independent Component Analysis of Tensors for Sensor Data Fusion and Reconstruction," which is a Non-Provisional patent application of U.S. Application No. 62/558,094, filed in the United States on Sep. 13, 2017, entitled, "Independent Component Analysis of Tensors for Sensor Data Fusion and Reconstruction," the entirety of which are hereby incorporated by reference. U.S. application Ser. No. 16/298,367 is also a Continuation-in-Part application of U.S. application Ser. No. 16/127,927, filed in the United States on Sep. 11, 2018, entitled, "Mixed Domain Blind Source Separation for Sensor Array Processing," which is a Non-Provisional patent application of U.S. Application No. 62/624,054, filed in the United States on Jan. 30, 2018, entitled, "Mixed Domain Blind Source Separation for Sensor Array Processing," the entirety of which are hereby incorporated by reference. U.S. application Ser. No. 16,298,367 is also a Non-Provisional application of U.S. Provisional Application No. 62/684,364, filed in the United States on Jun. 13, 2018, entitled, "Streaming Data Tensor Analysis Using Blind Source Separation," the entirety of which is incorporated herein by reference.

BACKGROUND OF INVENTION

(1) Field of Invention

The present invention relates to a system for detection of network activities and, more particularly, to a system for detection of network activities using transitive tensor analysis (TTA).

(2) Description of Related Art

A tensor is a generalization of matrices to higher dimensions (e.g., a multi-dimensional table of data values). Tensors can represent multiple relationships between entities in a communication network or multi-dimensional sensor data, such as hyperspectral image data. It is well-known that tensors can be decomposed into a sum of tensor factors where the factors represent structure or relationships in the data, such as communication patterns between entities in a computer or social network.

The current state-of-the-art for tensor decomposition is methods based on least squares fitting of data to the model. Examples of existing methods include PARAFAC (Parallel Factor Analysis), NPLS (Nonlinear Partial Least Squares), and ALS (Alternating Least Squares). Because these methods operate on the full tensor and use iterative optimization methods, they are slow, require significant memory, and do not scale well to higher dimensional tensors (scaling is exponential in the dimensionality of the tensor). They also do not handle sparse data well because gradients cannot be computed accurately when the data is sparse, which is often the case in network applications. In addition, they lack a mechanism for dividing up the tensor and processing the parts independently and in parallel using cloud computing.

Thus, a continuing need exists for a method for analyzing a large tensor by dividing it into smaller subtensors that can be independently decomposed into factors for analysis of tensors representing networks that are much larger than can be handled by any single processor.

SUMMARY OF INVENTION

The present invention relates to a system for detection of network activities and, more particularly, to a system for detection of network activities using transitive tensor analysis (TTA). The system comprises one or more processors and a non-transitory computer-readable medium having executable instructions encoded thereon such that when executed, the one or more processors perform multiple operations. The system divides a tensor, having a plurality of tensor modes, into a plurality of subtensors, wherein the tensor represents communications on a communications network comprising streaming network data. Each subtensor is decomposed, separately and independently on a separate processor, into a plurality of subtensor mode factors. Using transitive mode factor matching, orderings of the plurality of subtensor mode factors are determined. A set of subtensor factor coefficients is determined for the plurality of subtensor mode factors. Using the set of subtensor factor coefficients, the relative weighting of the plurality of subtensor mode factors is determined. A plurality of activity patterns represented by the plurality of subtensor mode factors is detected. Based on the detection, an alert of an anomaly is generated indicating a location of the anomaly in the communications network and a time of occurrence of the anomaly.

In another aspect, the plurality of tensor modes comprises two modes that represent connections between nodes of the communications network, and a third mode that represents a time dependence of the connections between nodes of the communications network.

In another aspect, decomposing each subtensor comprises converting the subtensor into a set of one-dimensional vector signals; using the set of one-dimensional vector signals as inputs to independent component analysis; and extracting the plurality of subtensor mode factors.

In another aspect, determining orderings for the plurality of subtensor mode factors comprises matching subtensor mode factors that are common between the plurality of subtensors.

In another aspect, determining orderings for the plurality of subtensor mode factors further comprises using the matching of the subtensor mode factors that are common between the plurality of subtensors to match subtensor mode factors that are not common via a transitive property.

In another aspect, determining a set of subtensor factor coefficients for the plurality of subtensor mode factors comprises using a pseudo-inverse of a subtensor factor dictionary matrix, wherein columns of the subtensor factor dictionary matrix are vectorizations of the plurality of subtensor factors.

In another aspect, transitive tensor analysis is applied to a sliding time window of streaming network data.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
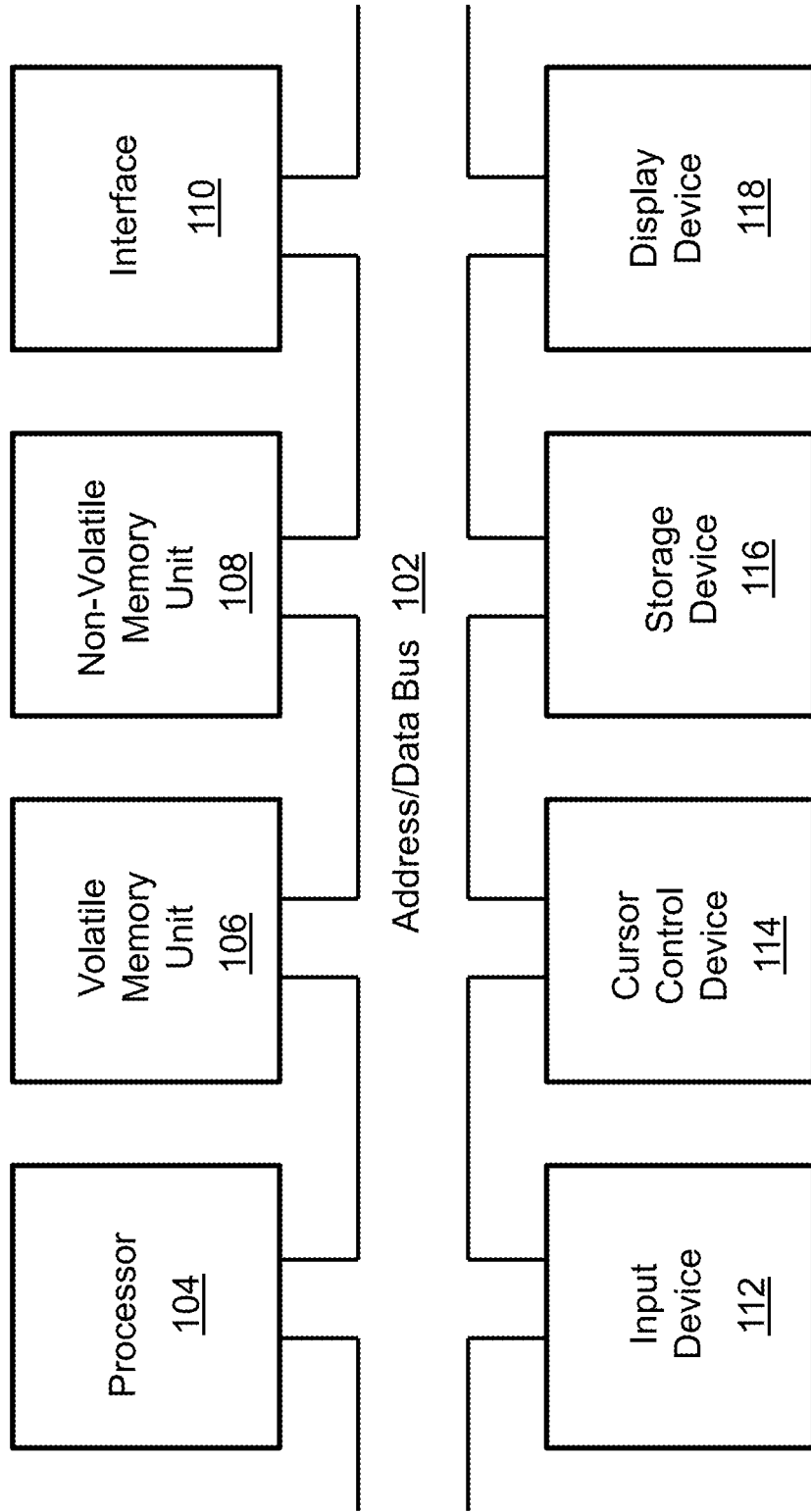
FIG. 1 is a block diagram depicting the components of a system for detection of network activities according to some embodiments of the present disclosure.

The present invention relates to a system for detection of network activities and, more particularly, to a system for detection of network activities using transitive tensor analysis. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

(1) Principal Aspects

Various embodiments of the invention include three "principal" aspects. The first is a system for detection of network activities. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within one or more computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology. Further, one or more processors 104 (or devices, such as autonomous platforms) can be associated with one or more associated memories, where each associated memory is a non-transitory computer-readable medium. Each associated memory can be associated with a single processor 104 (or device), or a network of interacting processors 104 (or devices), such as a network of autonomous platforms (e.g., autonomous vehicles, robots).

In one aspect, the computer system 100 may include an input device 112 coupled with the address/data bus 102, wherein the input device 112 is configured to communicate information and command selections to the processor 104. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 104. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
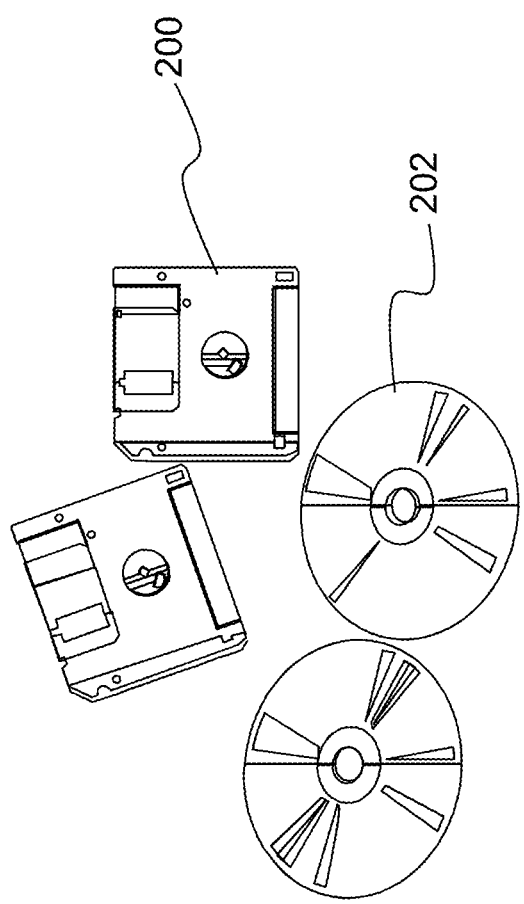
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Specific Details of Various Embodiments

Described is a method for applying Transitive Tensor Analysis (TTA), a unique method for decomposing tensors into a sum of simpler factors, to the problem of detecting activities in network data. A tensor is a generalization of matrices to higher dimensions (e.g., a multi-dimensional table of data values). Tensors can represent multiple relationships between entities in a communication network or multi-dimensional sensor data, such as hyperspectral image data. It is well-known that tensors can be decomposed into a sum of tensor factors, where the factors represent structure or relationships in the data, such as communication patterns over time between entities in a computer or social network.

TTA is a unique method for analyzing a large tensor by dividing it into smaller subtensors that can be independently decomposed into factors and then combining the results into a decomposition of the full tensor. TTA enables distributing a large tensor among multiple processors, including in the cloud, for analysis of tensors representing networks that are much larger than can be handled by any single processor. In addition to greatly reduced memory requirements, TTA also greatly reduces computational requirements for each processor. Existing tensor decomposition methods are based on the alternating least squares (ALS) algorithm in which an iterative gradient-based optimization is used to find the tensor factors that best fit the data. In U.S. application Ser. No. 16/034,780, which is hereby incorporated by reference as though fully set forth here, a fundamentally different tensor decomposition method, Independent Component Analysis of Tensors (ICAT), is described which has computational and memory usage advantages over ALS. ICAT analyzes a tensor using signal processing methods instead of iterative data fitting. Both ALS and ICAT estimate the tensor factors directly from data that sample the full tensor.

As described herein, TTA is an extension of ICAT for cloud (Internet) implementations that can handle very large tensors by dividing the tensor into subtensors and then decomposing each subtensor independently on a separate processor, thereby creating sets of factors for each subtensor. TTA then uses transitive factor matching to align and order the components of the subtensor factors so that they can be combined into a decomposition of the full tensor. Since the computational complexity of tensor decomposition is at least quadratic in the number of tensor elements and the structural complexity of subtensors is less than for the full tensor, performing ICAT tensor decomposition on the subtensors is much faster than on the full tensor. In addition, the subtensor decompositions can be performed in parallel so TTA can take advantage of cloud computing. Cloud computing is the on-demand availability of computer system resources, such as data storage (cloud storage) and computing power, without direct active management by the user.

TTA is very efficient in terms of processing speed and memory usage. The processing speed is faster than existing methods because it does not need to solve an alternating least-squares fitting problem in order to decompose a tensor as current methods do. TTA is also more memory efficient because the full tensor doesn't need to fit in the memory of any processor. In addition, only the nonzero elements of the tensor are used in computation and storage. The memory requirements scale linearly with the number of tensor dimensions, instead of exponentially, which makes processing of tensors with more than three dimensions practical. Finally, TTA can be naturally used for real-time streaming network data analysis using a sliding time-window.

Figure 3:
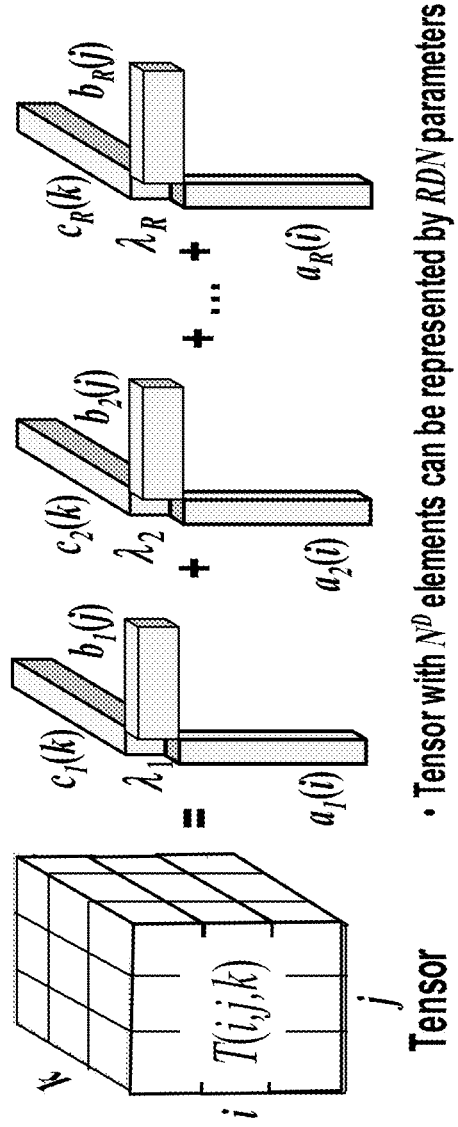
FIG. 3 is an illustration of canonical polyadic decomposition (CPD) of a third order tensor according to prior art, showing how tensor mode factors are combined to form tensor factors to reconstruct the tensor.

The concept of tensor decomposition, which can be used for network analysis, is illustrated in FIG. 3. A tensor is a multi-dimensional table of data values. For ease of illustration, three-dimensional (3D) tensors are used as examples. 3D tensors can represent communications on a network by using two dimensions, or modes, to represent connections between nodes. The third mode can be used to represent different topics or the time dependence of communication activities. Such a tensor can be decomposed into tensor factors, each of which is a simpler tensor that is constructed from the outer-product of three mode-factor vectors. The tensor factors represent structure in the data. For example, if the rows and columns of the tensor represent people in a social network, and the third dimension represents different types of links between them, the tensor factors can represent different social groups or communities with different interests. FIG. 3 illustrates canonical polyadic decomposition (CPD) of a third order tensor, which expresses the tensor as a weighted sum of R tensor factors, each of which is formed from the outer-product of three one-dimensional (1D) mode factor vectors, one for each mode or dimension of the tensor. The rank of the tensor is defined as the number of factors required to reconstruct the tensor.

Figure 4A:
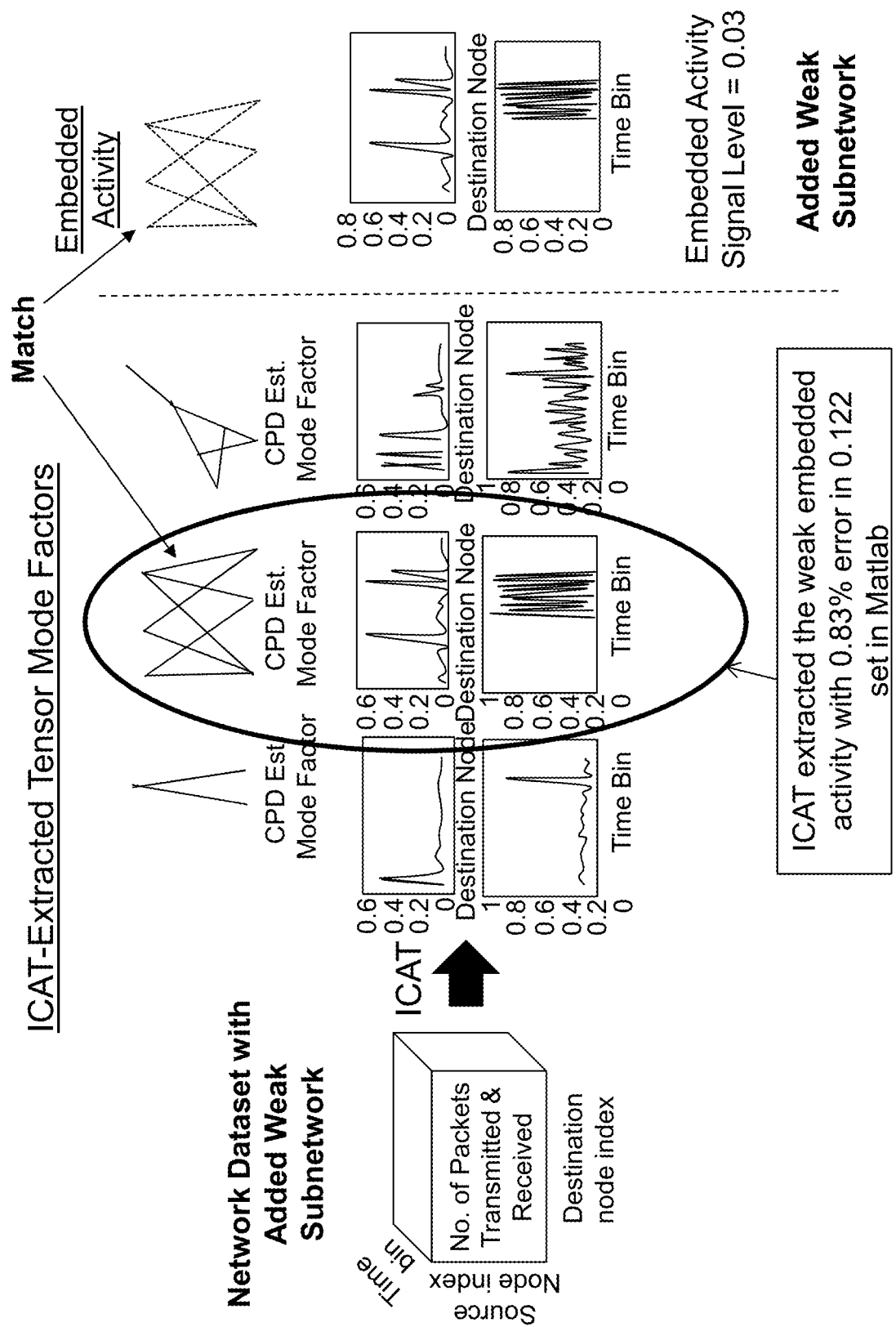
FIG. 4A is an illustration of independent component analysis of tensors (ICAT) tensor decomposition for detection of network activities, showing detection of weak activity, according to some embodiments of the present disclosure.
Figure 4B:
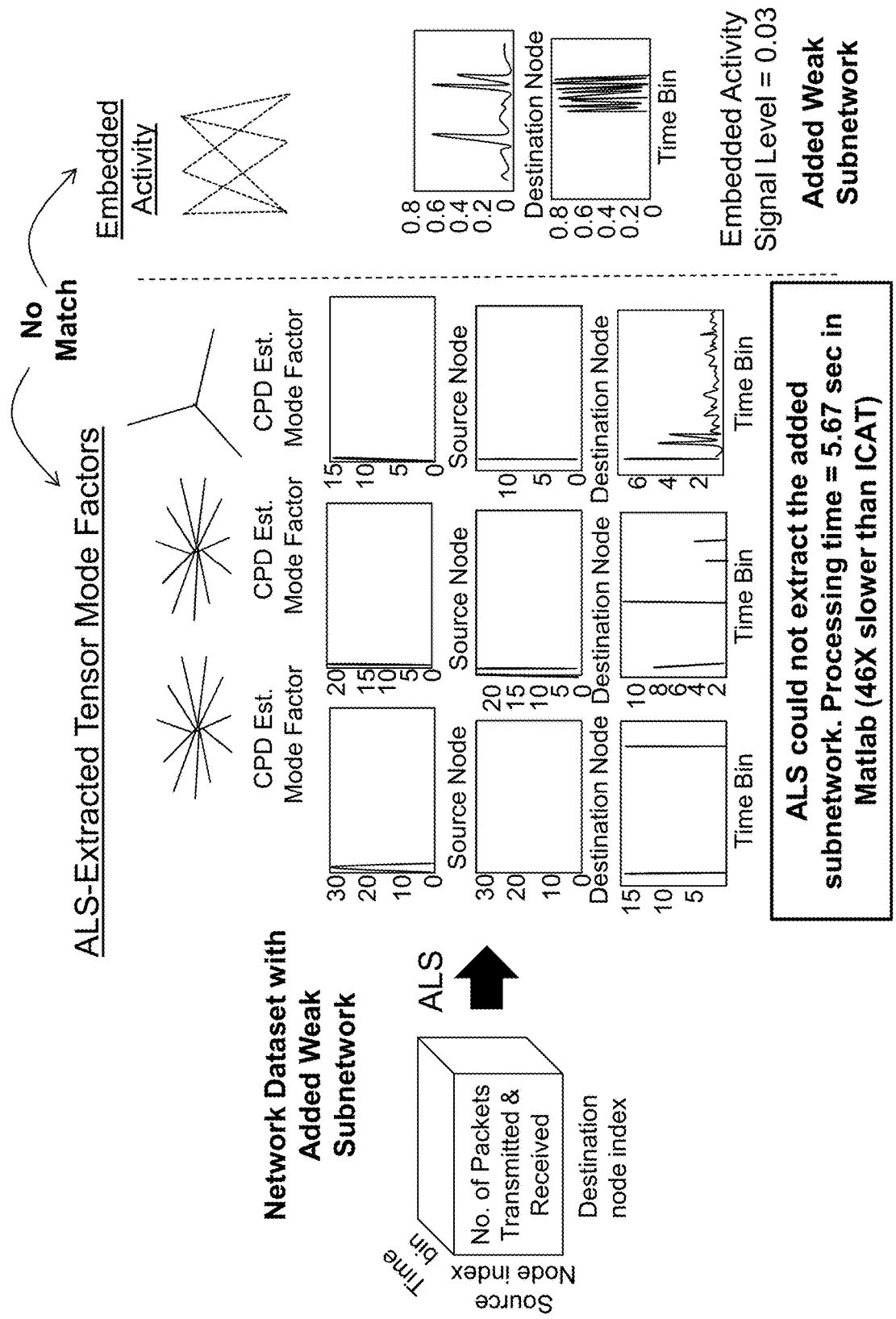
FIG. 4B is an illustration of independent component analysis of tensors (ICAT) tensor decomposition for detection of network activities according prior art, showing poor accuracy decomposition.

Tensor decomposition using conventional alternating least squares iterative optimization has been used successfully in many other applications involving multi-dimensional data, such as in movie recommendation systems (e.g., the Netflix™ challenge), sensor fusion, chemometrics, and network activity analysis. In U.S. application Ser. No. 16/034,780, tensor decomposition using Independent Component Analysis of Tensors (ICAT) was described. ICAT has large computational and memory usage advantages over conventional methods. An example use of ICAT for tensor analysis of network activities is shown in FIG. 4A. The data set consisted of packet data transmitted between nodes in a local area network. Conventional ALS-based methods could not detect the illustrated traffic patterns and weak embedded activity, as shown in FIG. 4B.

Figure 5:
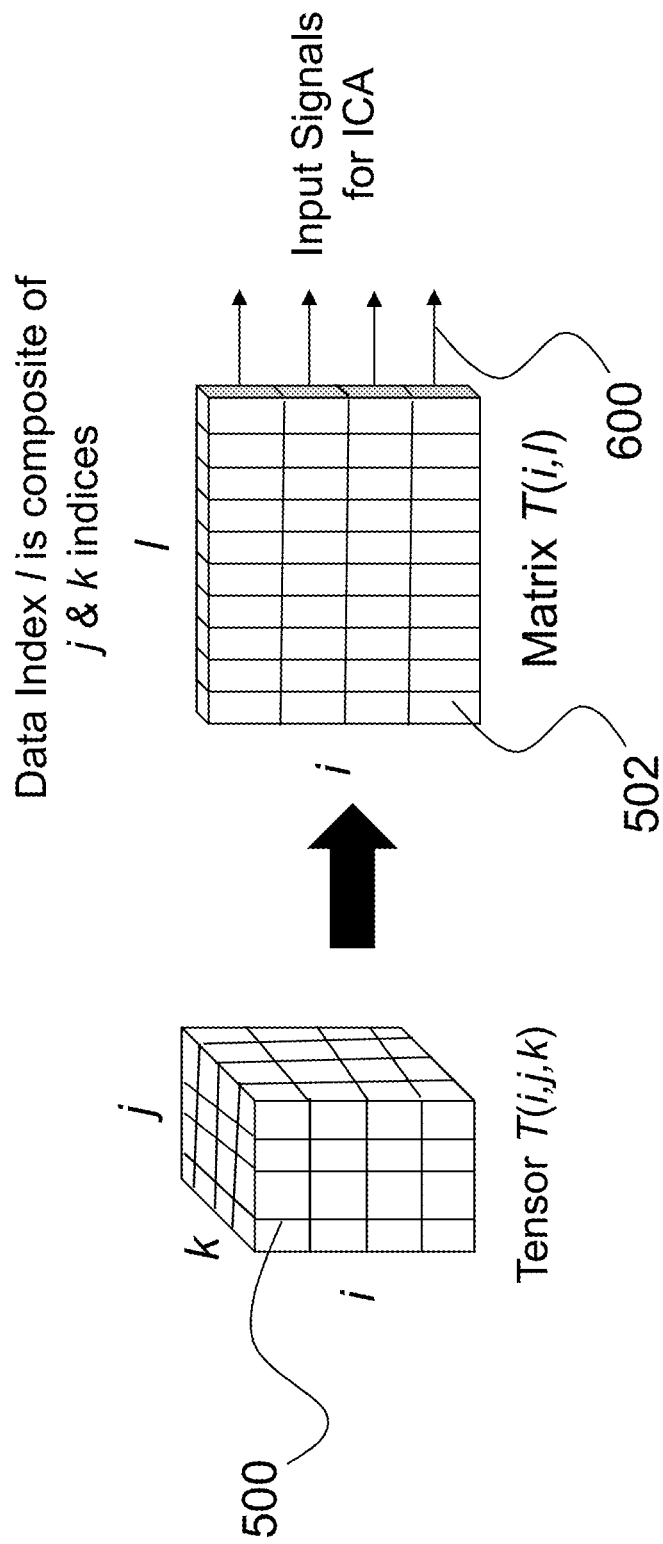
FIG. 5 is an illustration of reshaping or matricization of a tensor into a matrix whose rows represent a set of vector signals to be processed using independent component analysis (ICA), according to embodiments of the present disclosure.
Figure 6A:
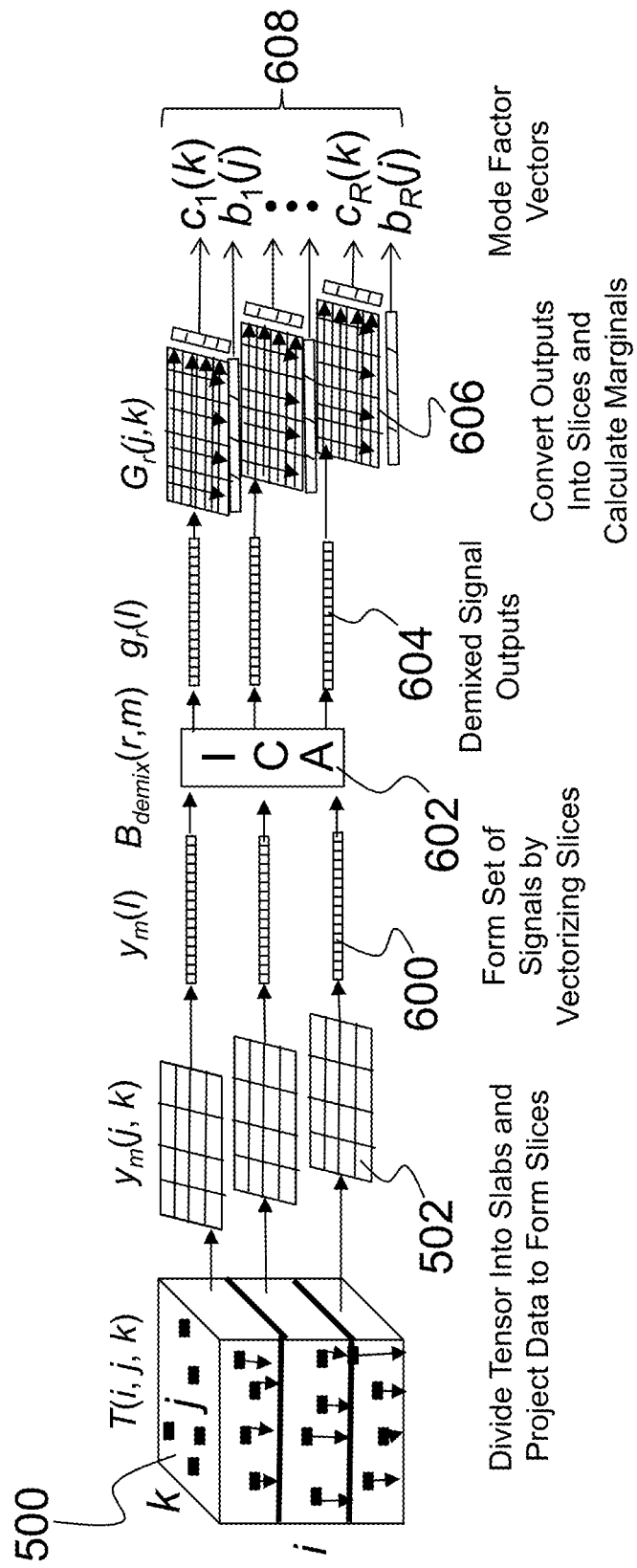
FIG. 6A is an illustration of Step 1 of ICAT tensor decomposition which uses matricization and ICA demixing to determine the mode factors of a tensor, according to some embodiments of the present disclosure.

Step 1 of ICAT tensor decomposition, which finds the mode factor vectors, is based on converting a tensor (element 500) into a set of 1D vector signals (i.e., vectorization) by reshaping the tensor (element 500) into a matrix (matricization) and using rows of the data elements (element 502) as 1D signal vectors, as shown in FIG. 5. The tensor (element 500) can then be decomposed by using the signals (element 600) as inputs to Independent Component Analysis (ICA) (element 602) which separates the signals into statistically independent components in step 1 to generate demixed signal outputs (element 604), as shown in FIG. 6A. The demixed 1D signal outputs (element 604) are then rearranged into 2D "slices" or matrices (element 606), which are outer-products of two of the mode factors for each tensor factor. The 1D marginals of the slices are then calculated by summing the slices along rows and columns. By marginalizing or integrating the slice in orthogonal directions, the individual mode factor vectors (element 608) can be extracted. However, because the ordering of ICA outputs is not predictable or consistent, the mode factor vectors (element 608) will not be necessarily aligned or matched across the different tensor factors. This mismatch can be corrected using transitive mode factor matching.

Figure 6B:
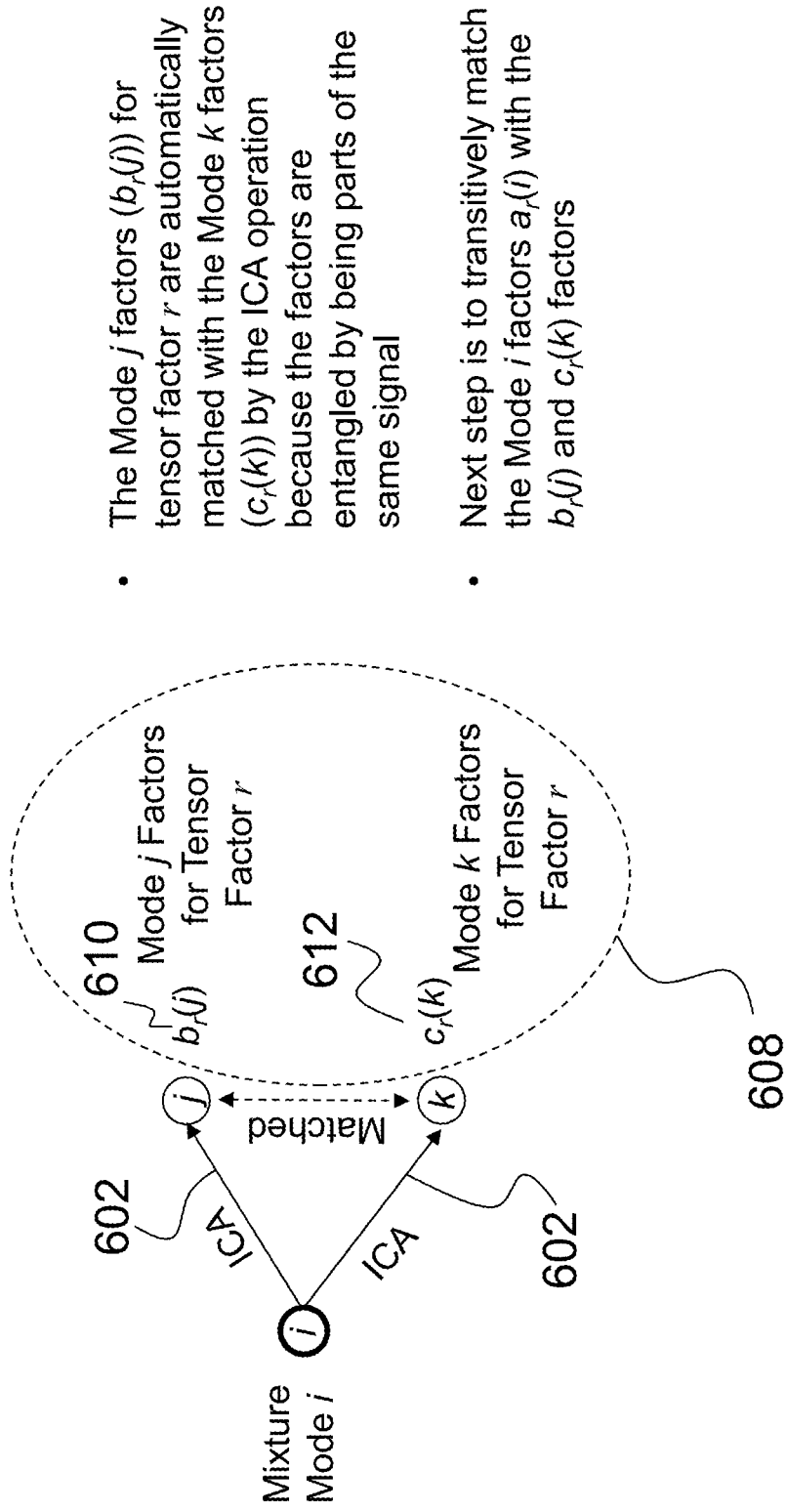
FIG. 6B is an illustration of the correct ordering of mode factors for two modes using ICA demixing according to some embodiments of the present disclosure.

FIG. 6B depicts a symbolic representation of the process in FIG. 6A for generating factors for modes j and k using mixtures indexed by mode i. The mode j factors ($b_r(j)$) (element 610) are automatically matched with the mode k factors ($c_r(k)$) (element 612) by the ICA operation (element 602) because the $b_r(j)$ (element 610) and $c_r(k)$ (element 612) factors are entangled due to the fact that they are parts of the same 1D ICA output signal r. The next step is to transitively match the mode i factors $a_r(i)$ with the $b_r(j)$ (element 610) and $c_r(k)$ (element 612) factors, as will be described in detail below.

Figure 7A:
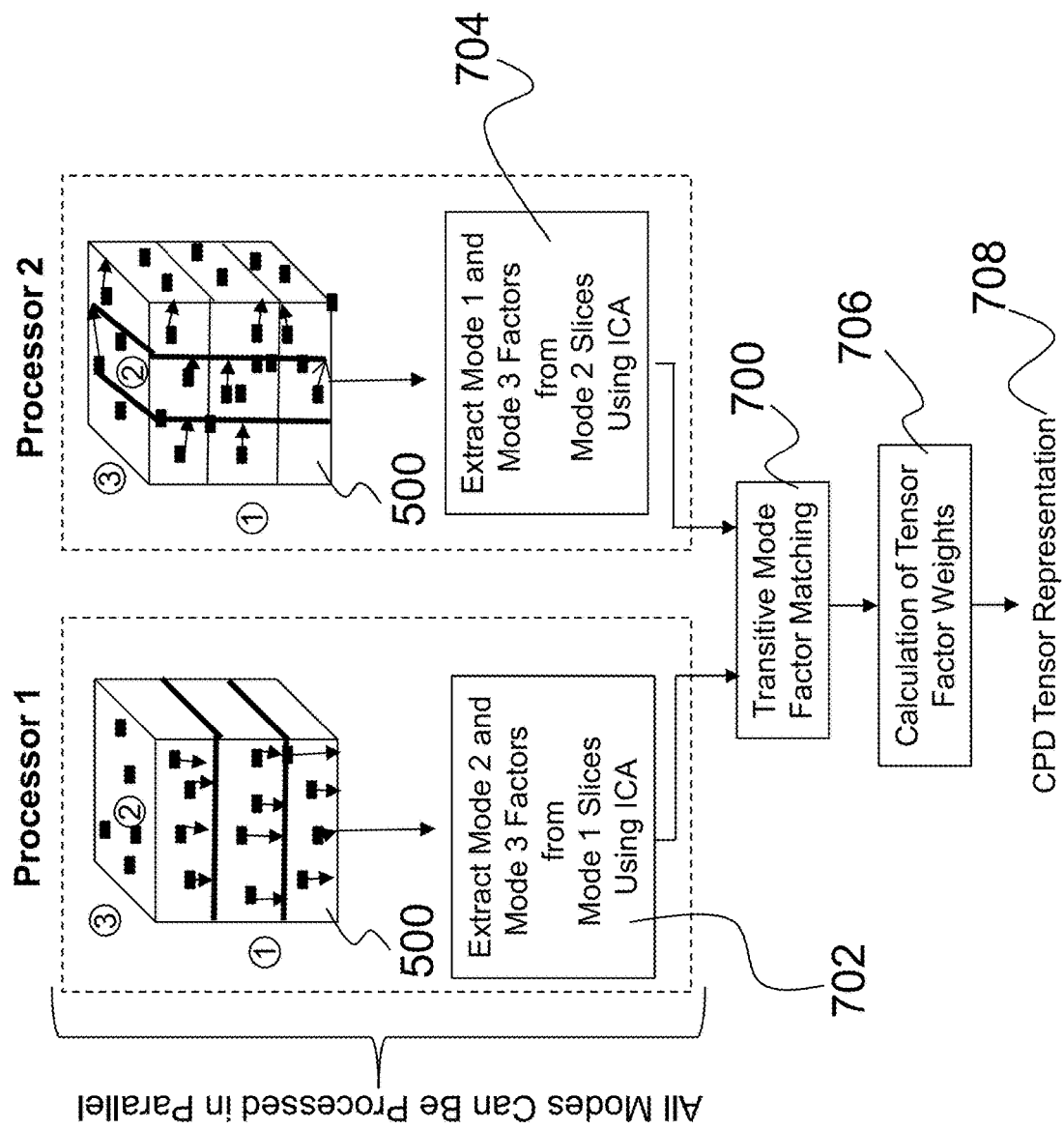
FIG. 7A is a flow diagram illustrating ICAT tensor mode factor extraction using ICA, factor matching using transitive mode matching (TMM), and calculation of mode factor weights for reconstruction of the tensor according to some embodiments of the present disclosure.
Figure 7B:
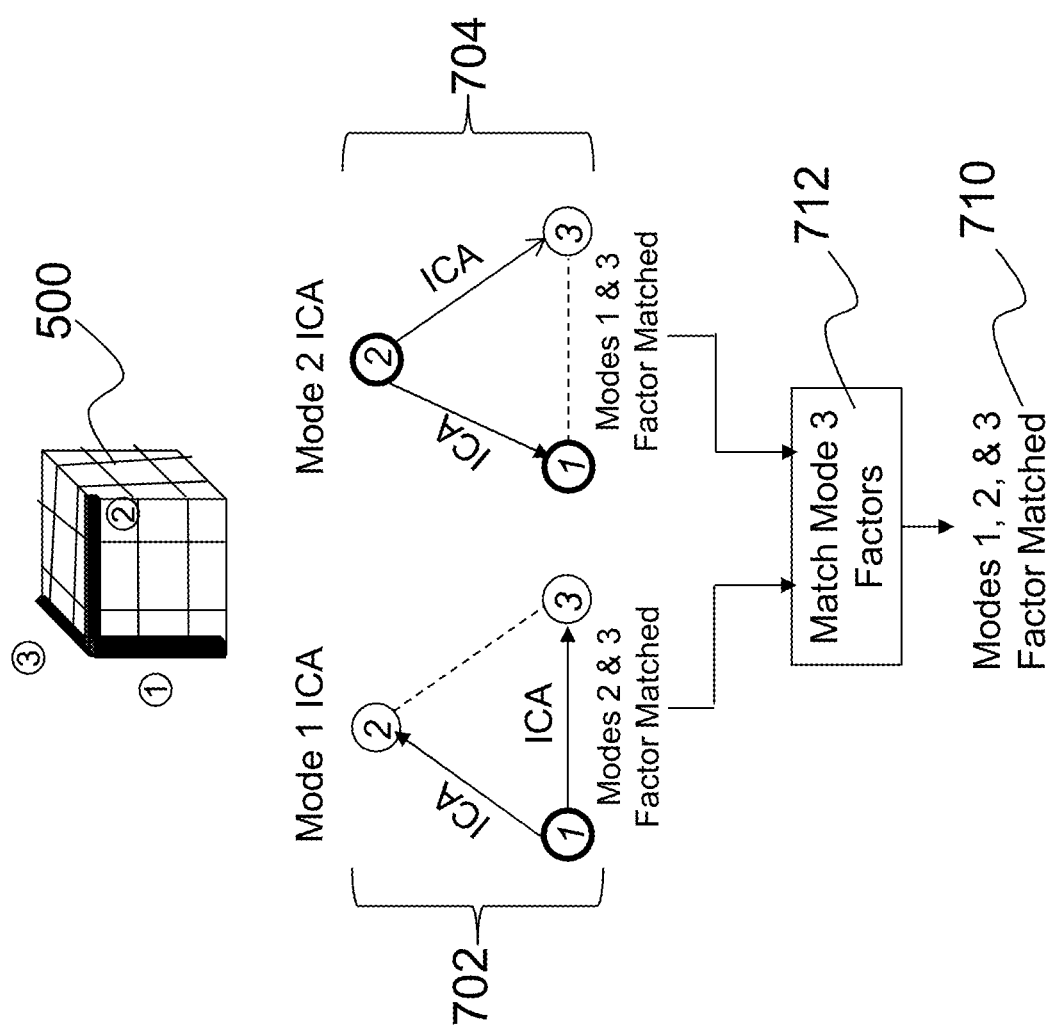
FIG. 7B is a symbolic illustration of ICAT tensor mode factor extraction and factor matching using TMM according to some embodiments of the present disclosure.

In step 2 of ICAT, the mode factor vectors are aligned using transitive mode matching (TMM) (element 700), shown in FIGS. 7A and 7B. TMM (element 700) is based on the idea that by dividing the tensor into 3D "slabs", integrating the slabs to form 2D "slices" normal to a "mixture mode", and vectorizing the slices into separate 1D signals, the mode factor vectors belonging to the slices become "entangled" due to the fact that they are parts of the same 1D signal processed by ICA. Therefore, when the signals are separated or demixed by ICA into different components, the demixed, entangled mode factors will always be correctly matched. If one uses another mode as the mixture mode, another set of entangled mode factors will be extracted and correctly matched. Matching of the common mode factors between the two demixing operations can then be used to match the mode factors that are not common to the two demixing operations. In other words, as illustrated in FIG. 7A, Mode 2 and Mode 3 factors are matched automatically using ICA (element 702) and Mode 1 is used to define the slices. In parallel, the Mode 1 and Mode 3 mode factors are matched by forming slices defined by Mode 2. Following TMM (element 700) transitive matching of mode factors for all three modes, weight coefficients for the tensor factors are calculated (element 706) using the process shown in FIG. 10 and described below, and a CPD tensor representation (element 708) as defined in FIG. 3. is generated. By the transitive principle, all factors will then be automatically matched (element 710) if the Mode 3 factors that are common to the two demixings are matched (element 712).

In the third step of ICAT, the tensor factor weight coefficients $\lambda_r$ are determined by sampling the tensor to form a measurement vector T(q) and using the known values of the tensor mode factors at those measurement locations to set up a system of linear equations as follows:

$$T(i(q),j(q),k(q)) = \sum_{r=1}^{R} \lambda_r a_r(i(q)) b_r(j(q)) c_r(k(q)),$$

or in single index form:

$$y(q) = \sum_{r=1}^{R} \lambda_r d(r, q),$$

or in matrix form: $Y=D\Lambda$, which has the solution $\Lambda=D^{-1}Y$, where $D^{-1}$ is the Moore-Penrose pseudo-inverse of matrix D.

Figure 8:
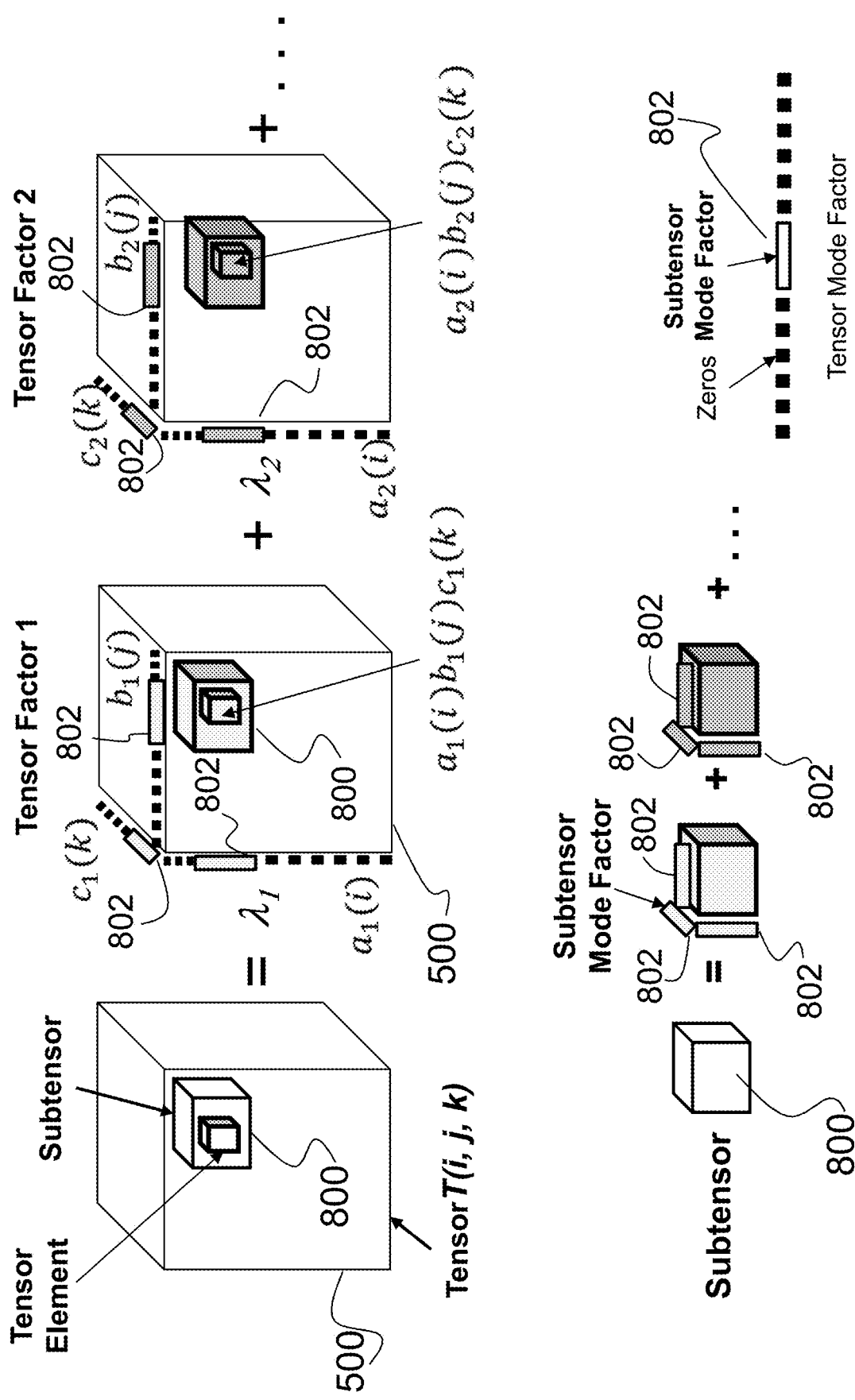
FIG. 8 is an illustration of tensor analysis by dividing the tensor into subtensors which are individually decomposed into subtensor mode factors according to some embodiments of the present disclosure.

An innovation of TTA is the extension of ICAT to handle very large tensors by dividing the tensor into subtensors, decomposing each subtensor independently, and then combining the outputs while avoiding the combinatorial explosion of possible combinations of subtensor mode factors. The concept of analyzing a tensor (element 500) by dividing it into subtensors (element 800) and then decomposing the subtensors (element 800) into subtensor mode factors (element 802), into a plurality of subtensor mode factors, which are one-dimensional vectors that can be combined using the outer-product operation to form a subtensor, is shown in FIG. 8. The intersection of regions of the tensor addressed by nonzero portions of the tensor mode factors define a subtensor. By varying the locations of the subtensor mode factor segments on the tensor mode factor vectors, any subtensor can be reconstructed. If one wishes to address only the subtensor shown then the rest of the tensor mode factor vectors must be zeros, as indicated by the dashed portions of the vectors.

Figure 9:
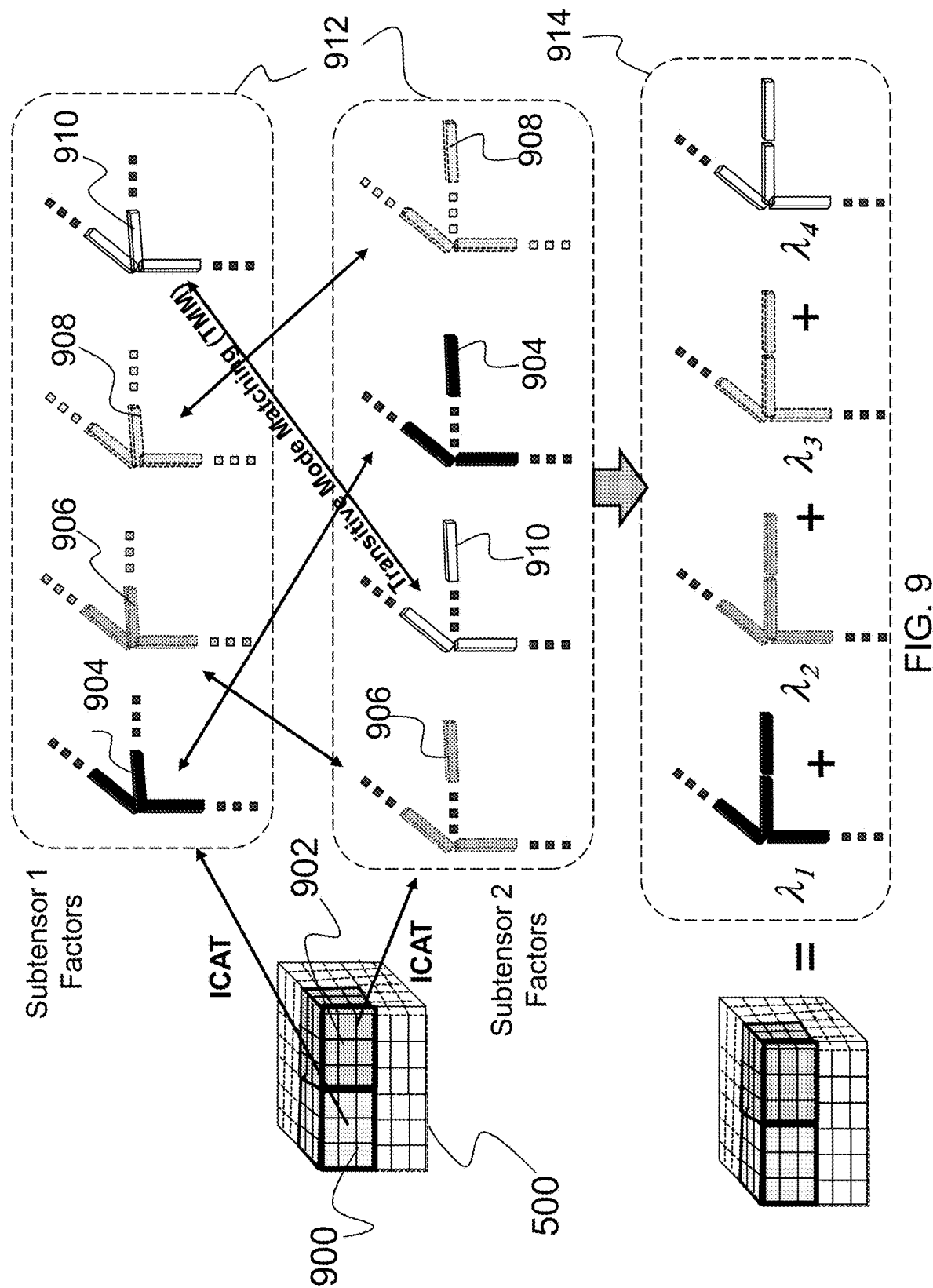
FIG. 9 is an illustration of matching of subtensor mode factors across subtensors using TMM according to some embodiments of the present disclosure.

Clearly, by varying the locations of the subtensor mode factor segments on the full tensor mode factor vectors, any subtensor can be reconstructed. Therefore, the question naturally arises, can one reduce the tensor decomposition problem to a set of subtensor decompositions and then use the results to decompose the full tensor? Doing so would be advantageous since the storage and computational loads could be shared among multiple processors. The reason that this has not been done yet is that the orderings of the subtensor factors resulting from the multiple subtensor decompositions would not be consistent (i.e., there would be cross-factor contaminations). While the correct ordering could be selected by measuring the difference between the original tensor data samples and the reconstructed values, the number of possible combinations of tensor orderings to test for consistency would grow at an exponential rate, making such a decomposition impractical. The solution for the ordering problem as implemented in TTA is based on transitive subtensor mode factor matching, as shown in FIG. 9 for the case of two subtensors (elements 900 and 902). The tensor (element 500) is divided into subtensors (elements 900 and 902), and the subtensors are decomposed separately and independently using ICAT (or conventional tensor decomposition methods). For illustrative purposes, it is assumed that the combination of subtensors (elements 900 and 902) has rank 4, (i.e., can be reconstructed using four factors). The subtensors (elements 900 and 902) also have rank 4 so they are decomposed into four subtensor factors (elements 904, 906, 908, and 910) using, for instance, ICAT. Since the subtensor mode factors (e.g., element 904, 906, 908, and 910) contain the same information as the full tensor mode factors, one should be able to combine the subtensor factors to form the decomposition of the full tensor. However, because the ordering of the subtensor factors is not consistent across subtensors, naively combining them will result in cross-factor contaminations. The invention described herein solves this problem using TMM. The subtensor mode factors (elements 904, 906, 908, and 910) are shown in distinct shades, where factors with the same shade have the same values. Note that the output orderings of the factors for subtensors 900 and 902 are inconsistent in the top part of FIG. 9 (element 912). In other words, combining mode factor element 906 with mode factor element 904 would be incorrect because the combination would have mismatched elements. The correct orderings can be determined by matching the subtensor mode factors (elements 904, 906, 908, and 910) that subtensors have in common. By the transitive property, the other mode factors will then be correctly matched as well. The four combinations of subtensor mode factors that form the consistent tensor factors are shown in the bottom part of FIG. 9 (element 914).

Figure 10:
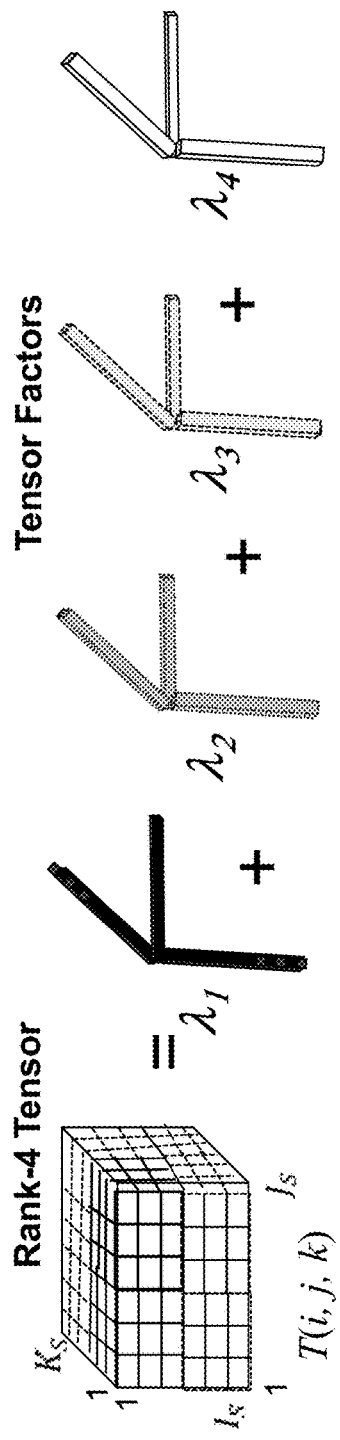
FIG. 10 is an illustration of transitive tensor analysis (TTA) calculation of subtensor factor coefficients according to some embodiments of the present disclosure.

The next step of TTA, shown in FIG. 10, is to calculate the subtensor factor coefficients $\lambda_n$ (element 1000). The factor coefficients determine the relative weighting of the tensor factors when they are added together to reconstruct the tensor. The factor coefficients can be determined using the pseudo-inverse of the subtensor factor dictionary matrix (element 1002 in FIG. 10) whose columns are vectorizations of the subtensor factors. This can be done by setting up a system of linear equations using samples of the tensor and a dictionary matrix (element 1002) where the columns are formed from the vectorized subtensor factors. The dictionary matrix (element 1002) multiplies a column vector consisting of the factor coefficients (element 1000), resulting in values that should match the measured tensor values (element 1004). The system of linear equations can be represented in matrix-vector form and solved for the factor coefficients (element 1000) by multiplying the measured data vector (element 1004) by the Moore-Penrose pseudo-inverse of the dictionary matrix (element 1002). An alternative method that is useful if the coefficient vector is sparse is to use reconstruction methods that enforce a sparsity constraint by minimizing the L1-norm of the coefficient vector:

$$\lambda^* = \mathrm{argmin}_\lambda \|\lambda\|_1 \text{ subj. to } \|y - D\lambda\|_2^2 \leq \sigma^2.$$

Here, $\|\cdot\|_1$ is the L1-norm (absolute sum of entries), and $\|\cdot\|_2^2$ is the squared Euclidean norm. A number of methods are available for solving the above L1-minimization and related objective functions to recover a provably optimal sparse representation.

Figure 11:
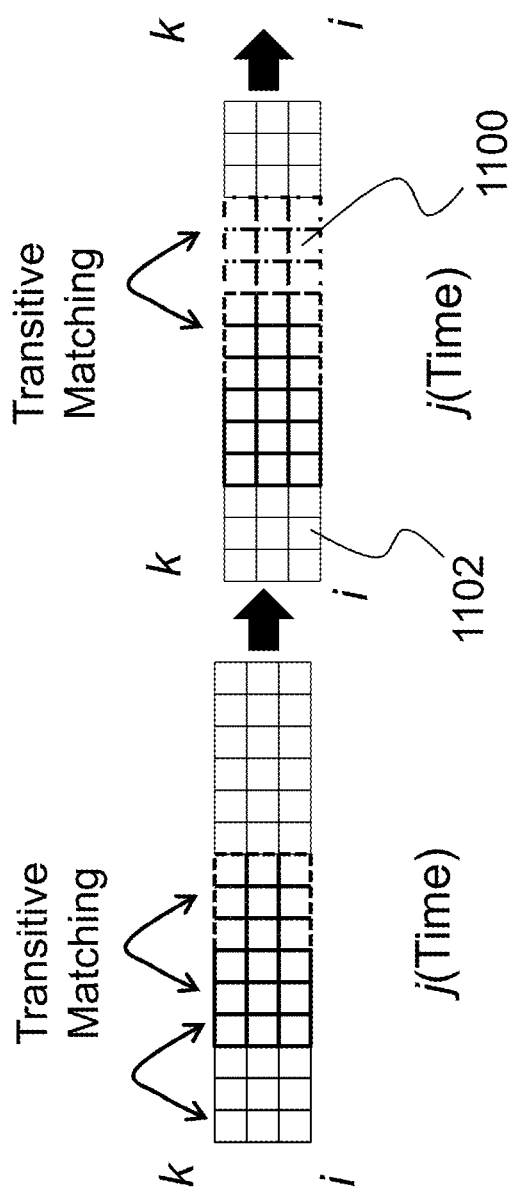
FIG. 11 is an illustration of application of TTA to sliding time window analysis of streaming tensor data according to some embodiments of the present disclosure.

By using time as one mode of the tensor, TTA can naturally and efficiently handle streaming tensor data using a sliding time window, as shown in FIG. 11. At each time increment, one only needs to calculate the decomposition of the new "head" subtensor (element 1100) and drop the "tail" subtensor (element 1102) in the sliding window. This method can be used, for example, to analyze the time varying behaviors and events in communication network or social media data.

Figure 12:
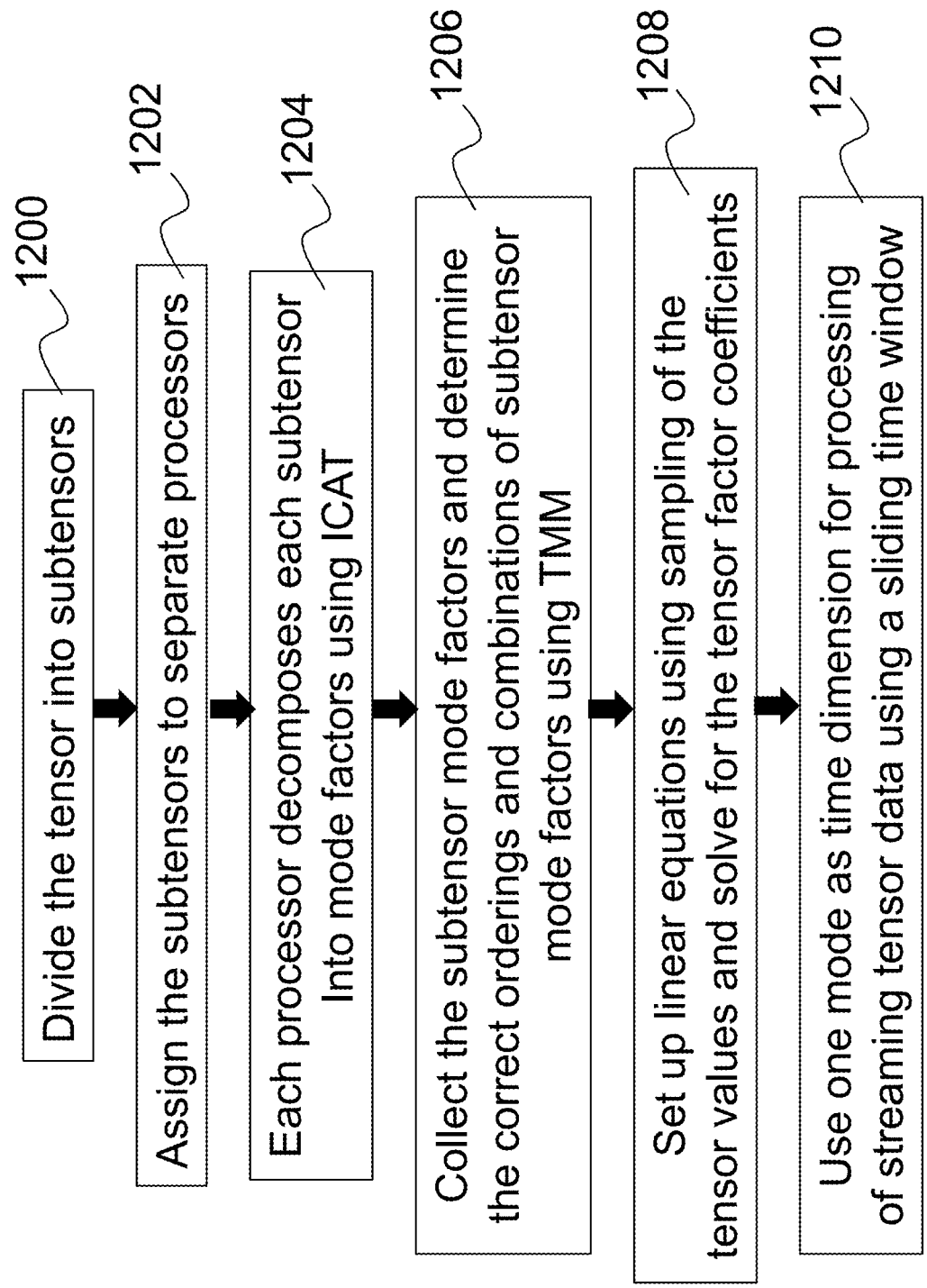
FIG. 12 is a flow diagram illustrating the processing steps of TTA for decomposing a tensor by dividing it into subtensors, decomposing the subtensors, matching the subtensor mode factors, and solving for the tensor factor coefficients according to embodiments of the present disclosure.

As illustrated in FIG. 12, the processing steps of TTA can be summarized as follows. First, divide the tensor into subtensors (element 1200). While the subtensors are shown as contiguous in FIG. 11, they can also be interlaced. Since the decompositions of the subtensors can be performed independently, it is possible to efficiently utilize multiple processors if they are available by assigning one or more subtensors to a processor (element 1202). Then, each processor decomposes each subtensor into mode factors using ICAT or conventional tensor decomposition (element 1204). Next, collect the subtensor mode factors and determine the correct orderings and combinations of subtensor mode factors using TMM (element 1206). Then, set up a system of linear equations using a sampling of the tensor values and solve for the tensor factor coefficients (element 1208). Finally, one mode is used as the time dimension to enable processing of streaming tensor data using a sliding time window (element 1210). An example application of the decomposed tensor data is detection of different network activities or patterns over time of communications between nodes in a network. A different activity is represented by each tensor factor which describes which nodes are communicating, the amount of communication, and the time of communication.

Using subtensor analysis for tensor decomposition has not been done before because of the arbitrary and inconsistent ordering of subtensor factor outputs. The ordering of the subtensor factors can be different for each subtensor so, in general, the mode factors for one subtensor will not "match-up" with other subtensors. Resolving the ordering using conventional methods is impractical because of the very large number of possible factor combinations to search over. TTA is unique in that it solves this "factor mismatch" problem using transitive tensor mode matching (TMM) based on independent component analysis (ICA). TMM works by "entangling" or coupling the dimensions or modes of separate subtensors in a vectorized representation. When the vectors are separated into factors using ICA, the factors for the entangled modes stay together in the correct combinations because they are parts of the same signal. The correct mode combinations for the other modes are determined using TMM. A simple system of linear equations can then be solved to determine the weighting coefficients for the factors that model the data.

The invention described herein can be utilized for computer network traffic analysis. A computer network can be described as a directed graph consisting of vertices and edges or links that connect the vertices. The vertices or nodes are host computers identified by Internet Protocol (IP) addresses, while the links between nodes represent paths over which information in the form of data packets travel. The links are directed in the sense that each packet contains both the destination address and the source address for the packet. The packets are directed by routers to other gateway computers and routers that have knowledge of a local domain of the network (e.g., addresses of computers in its domain). If a domain does not contain the destination address in a packet, the gateway will route the packet to the next gateway until it reaches a gateway that can deliver the packet to its final destination. The routers maintain data record tables containing each packet's origin, destination addresses, and the time of routing. The router data tables can be represented as multi-dimensional tensors, where the tensor dimensions or modes can be, for example, a packet origin address, a packet destination address, and a time of routing. The tensor value can represent the number of packets flowing between the addresses over a fixed time interval. In short, the tensor represents data traffic flows over time in a particular network domain or collection of domains, where the domains are subnets of a larger network.

An important application of the present invention is analysis of structure or patterns in the network traffic flow to detect cyber-attacks, bottlenecks, or particular communication activities indicative of high usage of network resources by groups or communities of network nodes. Tensor decomposition is a method for finding such structure in the data by representing the tensor as a sum of factor tensors formed from outer-products of 1D mode factors. Each tensor factor describes a communication pattern between subgroups of origin and destination nodes in the network. For example, a denial-of-service cyber-attack could be represented by a tensor factor where many origin nodes are suddenly connected to a destination node in a "star" pattern. The tensor decomposition can be performed at the router level in real-time or on a host computer or set of computers in offline mode after receiving data from one or more routers. The output is a list of alerts for such patterns in the traffic flows along with information on the nodes involved. The invention described herein covers Transitive Tensor Analysis (TTA), which is a method for more efficiently performing the tensor decomposition. It is valuable because the tensors representing network traffic can be very large so that a single processor cannot perform the decomposition due to processing time and/or storage space limitations. TTA enables the decomposition to be broken up into smaller subproblems, which can be distributed among multiple processors for parallel computation with one sub-problem per processor. The results can then be combined to form the full tensor factors.

While TTA can be applied to any data analysis application that involves tensor data, one non-limiting example is using TTA to more efficiently detect groups of communicating entities and activities in computer and social networks. For instance, it could be used for detection of intrusions or attacks on computer networks or detection of groups with common interests on social networks. The intrusion detections can be used to alert network operators of an intrusion, attack, or other anomaly and indicate the location (e.g., node identification) of the intrusion, attack, or anomaly in the network at the time of occurrence. Additionally, the system can provide guidance for mitigation of attacks by identifying the network nodes being targeted and either removing the nodes from the network or severing/blocking communication from nodes that are presenting an anomaly.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for detection of network activities using transitive tensor analysis, the system comprising:
   one or more processors and a non-transitory computer-readable medium having executable instructions encoded thereon such that when executed, the one or more processors perform operations of:
   dividing a tensor, having a plurality of tensor modes, into a plurality of subtensors, wherein the tensor represents communications on a communications network comprising streaming network data;
   decomposing each subtensor, separately and independently on a separate processor, into a plurality of subtensor mode factors;
   using transitive mode factor matching, determining orderings of the plurality of subtensor mode factors;
   determining a set of subtensor factor coefficients for the plurality of subtensor mode factors;
   using the set of subtensor factor coefficients, determining the relative weighting of the plurality of subtensor mode factors;
   detecting a plurality of activity patterns represented by the plurality of subtensor mode factors; and
   based on the detection, generating an alert of an anomaly indicating a location of the anomaly in the communications network and a time of occurrence of the anomaly.

2. The system as set forth in claim 1, wherein the plurality of tensor modes comprises two tensor modes that represent connections between nodes of the communications network, and a third tensor mode that represents a time dependence of the connections between nodes of the communications network.

3. The system as set forth in claim 1, wherein decomposing each subtensor comprises:
   converting the subtensor into a set of one-dimensional vector signals;
   using the set of one-dimensional vector signals as inputs to independent component analysis; and
   extracting the plurality of subtensor mode factors.

4. The system as set forth in claim 1, wherein determining orderings for the plurality of subtensor mode factors comprises matching subtensor mode factors that are common between the plurality of subtensors.

5. The system as set forth in claim 4, wherein determining orderings for the plurality of subtensor mode factors further comprises using the matching of the subtensor mode factors that are common between the plurality of subtensors to match subtensor mode factors that are not common via a transitive property.

6. The system as set forth in claim 1, wherein determining a set of subtensor factor coefficients for the plurality of subtensor mode factors comprises using a pseudo-inverse of a subtensor factor dictionary matrix, wherein columns of the subtensor factor dictionary matrix are vectorizations of the plurality of subtensor factors.

7. The system as set forth in claim 1, wherein the one or more processors further perform an operation of applying transitive tensor analysis to a sliding time window of streaming network data.

8. A computer implemented method for detection of network activities using transitive tensor analysis, the method comprising an act of:
   causing one or more processors to execute instructions encoded on one or more associated memories, each associated memory being a non-transitory computer-readable medium, such that upon execution, the one or more processors perform operations of:
   dividing a tensor, having a plurality of tensor modes, into a plurality of subtensors, wherein the tensor represents communications on a communications network comprising streaming network data;
   decomposing each subtensor, separately and independently on a separate processor, into a plurality of subtensor mode factors;
   using transitive mode factor matching, determining orderings of the plurality of subtensor mode factors;
   determining a set of subtensor factor coefficients for the plurality of subtensor mode factors;
   using the set of subtensor factor coefficients, determining the relative weighting of the plurality of subtensor mode factors;
   detecting a plurality of activity patterns represented by the plurality of subtensor mode factors; and
   based on the detection, generating an alert of an anomaly indicating a location of the anomaly in the communications network and a time of occurrence of the anomaly.

9. The method as set forth in claim 8, wherein the plurality of tensor modes comprises two tensor modes that represent connections between nodes of the communications network, and a third tensor mode that represents a time dependence of the connections between nodes of the communications network.

10. The method as set forth in claim 8, wherein decomposing each subtensor comprises:
    converting the subtensor into a set of one-dimensional vector signals;
    using the set of one-dimensional vector signals as inputs to independent component analysis; and
    extracting the plurality of subtensor mode factors.

11. The method as set forth in claim 8, wherein determining orderings for the plurality of subtensor mode factors comprises matching subtensor mode factors that are common between the plurality of subtensors.

12. The method as set forth in claim 11, wherein determining orderings for the plurality of subtensor mode factors further comprises using the matching of the subtensor mode factors that are common between the plurality of subtensors to match subtensor mode factors that are not common via a transitive property.

13. The method as set forth in claim 8, wherein determining a set of subtensor factor coefficients for the plurality of subtensor mode factors comprises using a pseudo-inverse of a subtensor factor dictionary matrix, wherein columns of the subtensor factor dictionary matrix are vectorizations of the plurality of subtensor factors.

14. The method as set forth in claim 8, further comprising an act of causing the one or more processors to perform an operation of applying transitive tensor analysis to a sliding time window of streaming network data.

15. A computer program product for detection of network activities using transitive tensor analysis, the computer program product comprising:
 computer-readable instructions stored on a non-transitory computer-readable medium that are executable by a computer having one or more processors for causing the processor to perform operations of:
  dividing a tensor, having a plurality of tensor modes, into a plurality of subtensors, wherein the tensor represents communications on a communications network comprising streaming network data;
  decomposing each subtensor, separately and independently on a separate processor, into a plurality of subtensor mode factors;
  using transitive mode factor matching, determining orderings of the plurality of subtensor mode factors;
  determining a set of subtensor factor coefficients for the plurality of subtensor mode factors;
  using the set of subtensor factor coefficients, determining the relative weighting of the plurality of subtensor mode factors;
  detecting a plurality of activity patterns represented by the plurality of subtensor mode factors; and
  based on the detection, generating an alert of an anomaly indicating a location of the anomaly in the communications network and a time of occurrence of the anomaly.

16. The computer program product as set forth in claim 15, wherein the plurality of modes comprises two tensor modes that represent connections between nodes of the communications network, and a third tensor mode that represents a time dependence of the connections between nodes of the communications network.

17. The computer program product as set forth in claim 15, wherein decomposing each subtensor comprises:
 converting the subtensor into a set of one-dimensional vector signals;
 using the set of one-dimensional vector signals as inputs to independent component analysis; and
 extracting the plurality of subtensor mode factors.

18. The computer program product as set forth in claim 15, wherein determining orderings for the plurality of subtensor mode factors comprises matching subtensor mode factors that are common between the plurality of subtensors.

19. The computer program product as set forth in claim 18, wherein determining orderings for the plurality of subtensor mode factors further comprises using the matching of the subtensor mode factors that are common between the plurality of subtensors to match subtensor mode factors that are not common via a transitive property.

20. The computer program product as set forth in claim 15, wherein determining a set of subtensor factor coefficients for the plurality of subtensor mode factors comprises using a pseudo-inverse of a subtensor factor dictionary matrix, wherein columns of the subtensor factor dictionary matrix are vectorizations of the plurality of subtensor factors.

* * * * *